Sept. 1, 1970

J. L. E. THUILLIER 3,526,082

APPARATUS FOR REMOVING DUST FROM GASES

Filed June 27, 1968

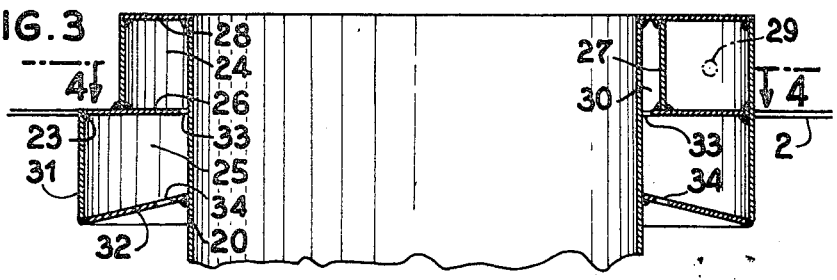
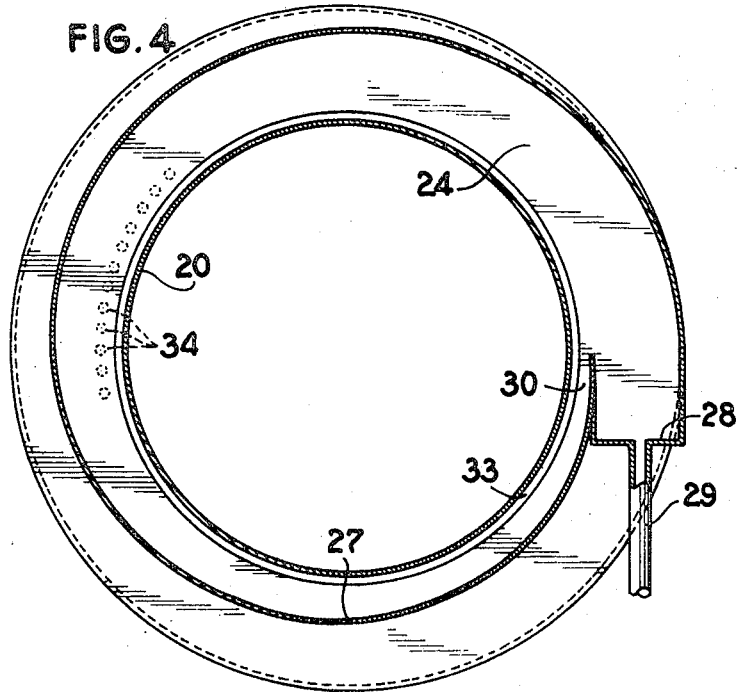
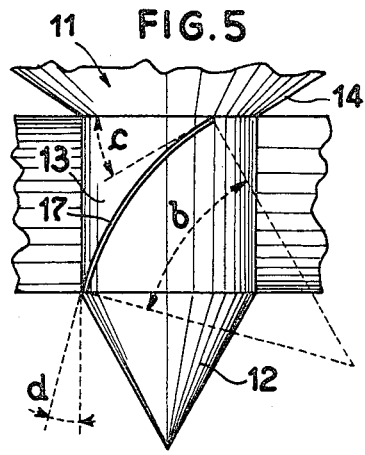
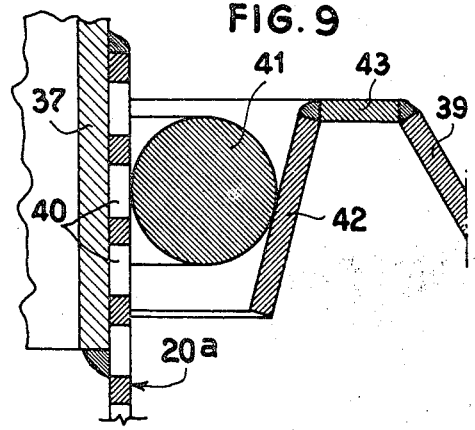

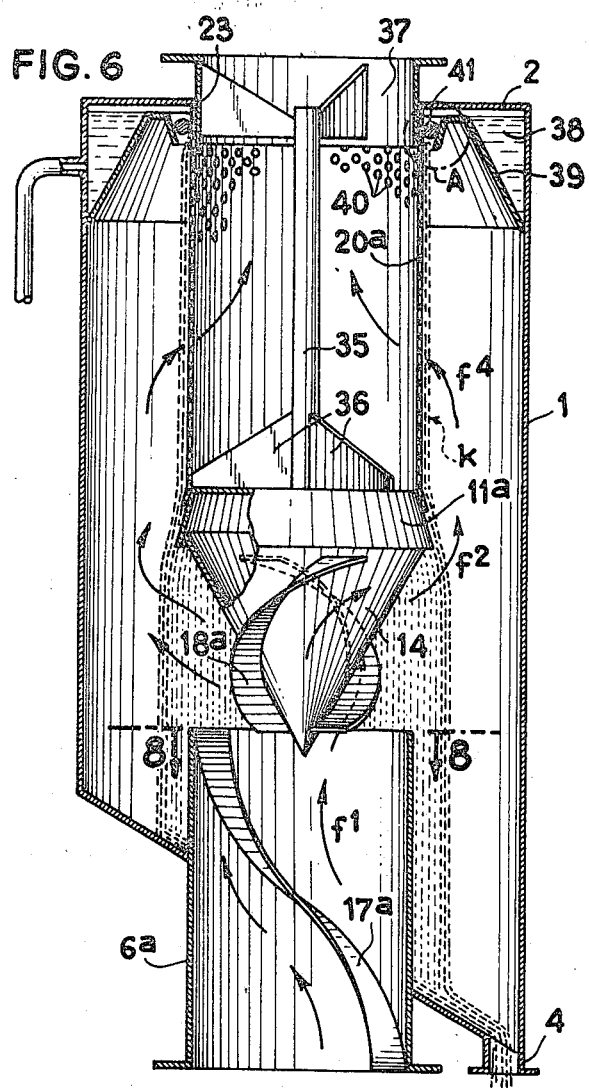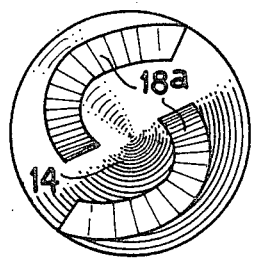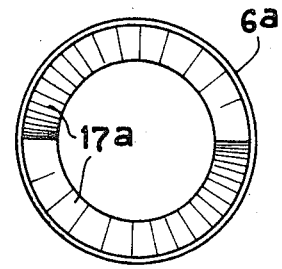

United States Patent Office 3,526,082
Patented Sept. 1, 1970

3,526,082
APPARATUS FOR REMOVING DUST
FROM GASES
Jean Louis Edouard Thuillier, 12 Salles la Source-
Cadayrac, France
Filed June 27, 1968, Ser. No. 740,720
Claims priority, application France, July 6, 1967,
113,430
Int. Cl. B01d 47/10
U.S. Cl. 55—235                    13 Claims

ABSTRACT OF THE DISCLOSURE

An apparatus for removing dust from a gas. The apparatus comprises a case in which means are provided for imparting a giratory motion to the gas and means for feeding and guiding dust-removing water so that the water travels in the opposite direction to the gas and constitutes a stable wall of water which is concentric with the giratory motion of the gas. Means are provided to constrain the gas to pass through the wall of water.

---

The present invention relates to the removal of dust from cold or hot gases, such as gases issuing from foundry furnaces, industrial smokes, gas from pneumatic conveyor installations.

The object of the invention is to provide an improved highly-efficient apparatus for removing dust from gas, said apparatus comprising imparting a giratory movement to the gas from which dust is to be removed and passing it through a stable wall of water.

The very thorough dust removal achieved is due to a double effect, namely the effect of centrifugal force exerted directly on the dust and other particles in suspension in the rotating gas and the effect of the direct contact of this gas with the wall of water which hydraulically filters said gas.

Another object of the invention is to provide a dust-removing apparaus which comprises feed and guide means for imparting a giratory motion to the gas from which dust is to be removed, forming with the dust-removing water which circulates in the opposite direction to said gas a stable wall of water which is concentric with said motion and guiding said gas so as to constrain it to pass through said wall of water.

Further features and advantages of the invention will be apparent from the ensuing description with reference to the accompanying drawings.

In the drawings:

FIG. 3 is a diametral sectional view of the upper part of the apparatus on a scale greater than that of FIGS. 1 and 2;

FIG. 4 is a horizontal sectional view taken along line 4—4 of FIG. 3;

FIG. 5 is a partial sectional view taken along line 5—5 of FIG. 2 on an enlarged scale;

FIG. 6 is a vertical diametral sectional view, with parts cut away, of another embodiment of the invention;

FIG. 7 is a top plan view of the centre conical core of the embodiment shown in FIG. 6;

FIG. 8 is a partial plan view taken along line 8—8 of FIG. 6, and

FIG. 9 is a sectional view on an enlarged scale of a detail of the part of the apparatus surrounded by the circle A in FIG. 6.

Figure 1:
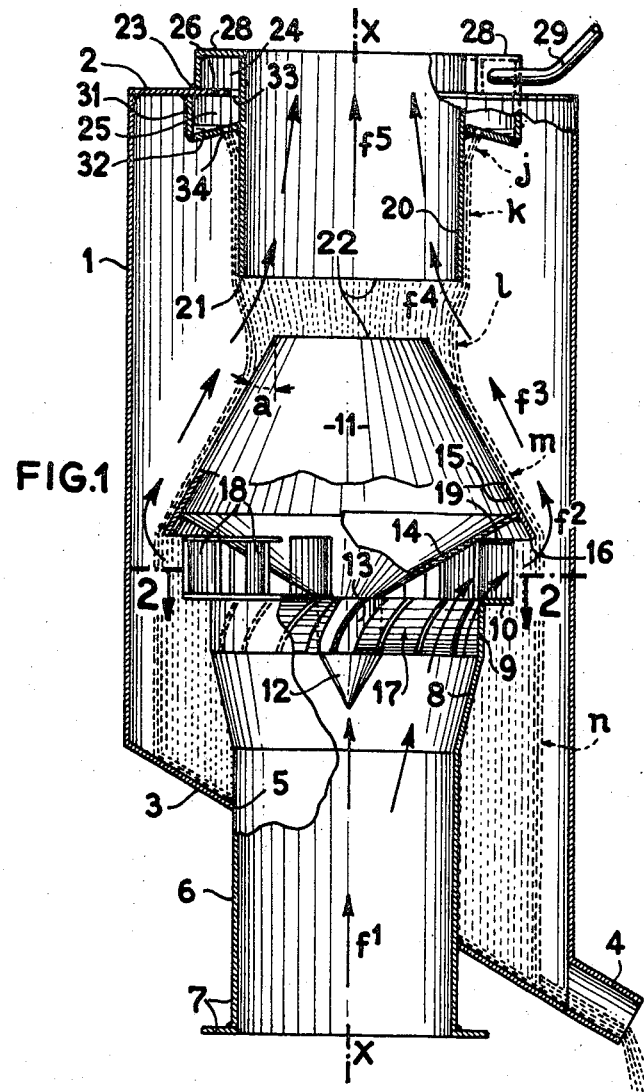
FIG. 1 is an elevational view, partly in section and partly cut away, of a dust-removing apparatus for a gas according to the invention.

In the embodiment shown in FIGS. 1–5, the apparatus is constructed of sheets of stainless steel interconnected by welding, riveting or fastening and comprises a cylindrical fluidtight case 1 having a vertical longitudinal axis X—X in operation of the apparatus. This case 1 comprises a transverse top wall 2 and an inclined bottom wall 3 which defines a lower part having an outlet 4 for the water containing the dust removed from the gas. This bottom wall 3 is provided with a centre opening 5 on the edge of which is secured a longitudinally and axially extending unit comprising in series relation, starting from the bottom: a supply tube 6 for the gas to be cleaned, this tube being open throughout its length and terminating outside the case 1 in a flange 7 or other means for securing it to the outlet conduit (for example a chimney stack) for the gases from which dust is to be removed; the tube 6 is upwardly extended by a frustoconical portion 8 followed by a cylindrical portion 9 which terminates in a transversely extending flange 10, a hollow centre core 11 comprising, starting from the bottom, a ogival or conical portion 12, a cylindrical portion 13, a lower upwardly-divergent frustoconical portion 14 and a downwardly divergent upper frustoconical portion 15 terminating in a perfectly burr-free polished circular edge 16 and overlying and extending downwardly beyond the upper end of the portion 14; the apex half-angle or slope $a$ of the upper portion 15 is preferably between 15 and 30, 30° being a maximum value not to be exceeded; and, between the tube 6 and the core 11, two sets of blades, namely an upstream (relative to the flow of gas) set of blades 17 and a downstream set of blades 18 which, in addition to their functions explained hereinafter, interconnect the core 11 and the tube 6.

The upstream blades 17 extend radially and have alternately two different lengths, the longer blades (FIG. 2) connecting the portion 13 of the core 11 to the portion 9 of the input tube 6, the shorter blades extending between the longer blades and from the portion 9 of the tube 6. All these blades have a part-cylindrical shape whose directrix is shown in respect of one of the blades in FIG. 5. The blade consists of ⅛ of a cylinder of revolution and consequently has an angle subtended at the centre $b$ of 45°. The tangent to its upper end makes with the horizontal transverse plane an angle $c$ of about 30°, whereas the tangent to the lower end makes with the vertical an angle $d$ of about 15°. The number of blades is not critical and can be advantageously equal to sixteen.

Figure 2:
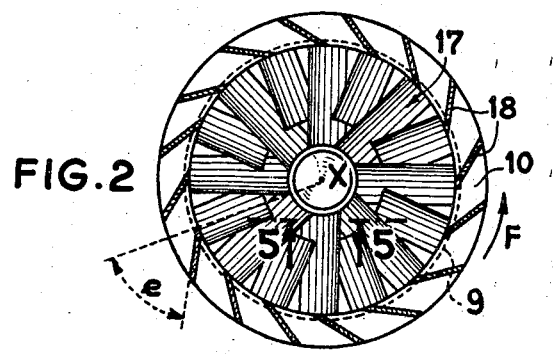
FIG. 2 is a cross-sectional view taken along line 2—2 of FIG. 1.

The downstream set of blades 18 is located between the flange 10 and a horizontal flat ring 19 secured to the portion 14. Its blades act as spacer members between the tube 6 and the core 11, these blades connecting the latter to the tube. They are plane and inclined to corresponding radial planes at an angle $e$ (FIG. 2).

As concerns the gases from which dust is to be removed, the apparatus comprises an upper axial gas outlet tube 20. This tube is secured to the cover 2 of the case 1, as will be explained hereinafter. This tube 20 has such length that its lower edge 21 is spaced from the core 11 so as to define therewith an annular passage circumferentially extending communication means 22 (FIG. 2). Its outside diameter equals that of the gas inlet cylinder or tube 6 and exceeds that of the small base of the upper frustoconical portion 15 of the core 11. Its outer face is smooth and the lower edge 21 is perfectly burr-free and polished. It is preferably connected to the outer cylindrical face by a small very polished fillet.

The apparatus is completed by means for feeding, distributing and guiding the dust-removing water which co-operate with the tube 20.

The upper end wall 2 of the case 1 has a large centre opening 23 (FIG. 1) in which is attached a device for feeding and distributing the dust-removing water. This device comprises, around the tube 20, an annular enclosure divided into two superimposed annular compartments 24 and 25 (FIGS. 1 and 3).

The upper compartment 24 is defined by an annular transverse bottom wall 26, a spiral-shaped wall 27 and an upper flange 28; this compartment therefore has the shape of a volute the radial width of which decreases from its widest end which is closed by a transverse wall 28 through which communicates with the compartment a pipe 29 supplying dust-removing water or other liquid, to the adjacent narrow end 30 (seen in particular FIG. 4).

The annular lower compartment 25 is defined by the tube 20, the horizontal wall 26, an outer cylindrical wall 31 and a frustoconical bottom wall 32.

The two compartments 24, 25 intercommunicate by way of a continuous slot 33, or a series of apertures, provided between the tube 20 and the inner edge of the wall 26. Further, the lower compartment 25 communicates downwardly with the exterior of the tube 20 by way of a series of apertures 34 which are evenly spaced apart throughout the periphery and inclined downwardly towards thes outer face of the tube 20 so as to direct towards the latter the small jets of water issuing from these apertures.

The apparatus operates in the following manner; circuit of the dust-removing water and the circuit of the gases being described in turn.

Water is supplied by way of the pipe 29 to the volute compartment 24 whence it flows by way of the slot 33 into the lower compartment 25. The flow is so arranged that this compartment 24 remains substantially full of water which rotates continuously therein before passing into the lower compartment 25. The water issues from the latter by way of the apertures 34 in the form of small jets $j$ (FIG. 1) which unite and spread over the outer face of the tube 20 where the water forms a continuous tubular sheet of water $k$. This sheet of water leaves the end of the tube 20 at 21 and slightly contracts in the form of an aerial, stable and continuous wall $l$ which completely surrounds the passage 22. The water thereafter falls onto the frustoconical portion 15 over which it runs at $m$. It leaves this portion at 16 and falls in the form of a second aerial, stable and continuous wall of water $n$ onto the inclined bottom wall 3 along which it flows to the outlet 4.

The following will be noted:

The whirl of water formed and maintained in the volute 24 favours the formation of the continuous sheet of water $k$ by equalizing the flow through out the length of the slot 22 and consequently ensures the stability of the walls of water $m$ and $n$ when the apparatus is subjected to vibrations or the action of the wind;

The highly polished condition of the edges 21 and 16 of the tube 20 and frustoconical portion 15 precludes any tearing of the walls of water $l$ and $n$ and contributes to their stability;

There is no risk of the water flowing directly into the sets of blades owing to the fact that the portion 15 extends well beyond the set of blades 18;

With the angle $a$ of the frustoconical portion 15 having a value between 15 and 30° and on condition that the lower edge 16 of this frustoconical portion 15 is spaced a few centimetres from the case 1, no splashing of water occurs against this wall and consequently there is no danger of the water spurting through the blades 18 and 17 into the chimney stack in which the apparatus is inserted.

As concerns the gas from which dust is to be removed, it flows upwardly through the path indicated by the arrows in FIG. 1. It enters the apparatus by way of the lower end of the tube 6 (arrow $f^1$) and encounters the set of blades 17 which converts the vertical velocity of each gaseous molecule relative into a velocity which is roughly horizontal and already inclined to a radius so that the gas starts a giratory motion which the downstream set of blades 18 accentuates. Owing to this giratory motion, the dust issuing from the set of blades 18 also rotates about the axis X—X. The particles of dust carried along by the gas are therefore subjected to centrifugal force. They reach the wall of water $n$ which wets them and carries them downwardly unless the kinetic energy of the particles is such that they travel through this wall and abut the wall of the case 1 whence they drop under the effect of gravity to the inclined bottom wall 3.

The gas undergoes only a small pressure drop in the course of its passage through the sets of blades, the latter being so arranged as to allow a section of passage for this gas which is as constant as possible. When it issues from the set of blades 18, the gas undergoes a giratory motion in the direction of arrow F (FIG. 2) so that at each point of the wall of water the path of a molecule of gas is roughly parallel to the tangent to this wall. Any gaseous molecule, when it reaches this point, therefore licks the wall which is concentric to its giratory motion and passes through this wall only very gradually and in the direction of arrows $f^2$ (FIG. 1) so that in the event of accidental, that is temporary, tearing of the wall, there is little likelihood that this molecule would not be stopped by this wall and that the small particles of dust still contained in the gas could escape from the action of the water. The water of the wall therefore removes the major part of the powdery particles from the gas which had not been removed therefrom by centrifugal force. Consequently, an already very clean gas, or better still a veritable fog (since the gas has received water by dynamic entrainment at the outlet of the sets of blades in passing through the wall of water), rises in the direction of arrows $f^3$ in flowing round the core 11 outside the sheet of water which flows along this core at $m$. The gas thereafter passes once again in the direction of arrow $f^4$ through the aerial wall of water $l$ towards the axis of the apparatus and is completely cleaned therein, especially since the efficiency of the wall of water $l$ is increased owing to the fact that the direction of the movement of the gas tends to constrict or pinch the wall of water instead of dispersing it. Consequently, a perfectly clean gas rises in the tube 20 in the direction of arrow $f^5$ and escapes from the top of the apparatus.

With reference now to the simplified embodiment shown in FIGS. 6–9, this embodiment differs from the first in the following respects: The centre core 11$^a$ is independent of the inlet tube 6$^a$; it is suspended, through an axial rod 35 reinforced by gussets 36, from an upper sleeve 37 fixed in the opening of the upper end of the wall 2 of the case 1 and is devoid of the cylindroconical portion 12, 13 of the first embodiment;

The sets of blades 17 and 18 of the first embodiment are replaced by helicoidal elements 17$^a$ and 18$^a$, the elements 17$^a$ being located in the tube 6$^a$ and the elements 18$^a$ on the lower conical portion 14 of the core 11;

The water supply device is arranged in the form of an annular compartment 38 between the case 1, the cover 2 and an inclined wall 39 attached in this case;

The outlet tube 20$^a$ is provided with a series of apertures 40 or communication means which are arranged circumferentially in a staggered relation and it connects the upper sleeve 37 to the core 11$^a$ (FIGS. 6 and 9);

The water flows between the annular compartment 38 and the outer face of the tube 20$^a$ by way of passages formed by the upper apertures 40 of the tube 20$^a$ and ring 41 (FIGS. 1 and 9) which connects this tube to the fustoconical portion 39 so as to constitute flow means operating on the overflow principle.

It will be observed that the water therefore runs down the perforated tube 20$^a$ at $b$ and the gas passes a second time through the wall of water thus formed and through the apertures 40 of the tube 20$^a$ and reaches the outlet sleeve 37. The gas first travels through the wall of water at $f^2$ as in the first embodiment.

The apparatus is extremely simple to mount. It can be pressed in the extension of the chimney stack or in the inlet end of the latter, in which case the pipes supplying water and discharging the water containing the dust would be very short.

Although specific embodiments of the invention have been described, many modifications and changes may be made therein without departing from the scope of the invention as defined in the appended claims.

A plurality of apparatuses could be arranged in parallel and/or in series relation.

Having now described my invention what I claim as new and desire to secure by Letters Patent is:

1. An apparatus for removing dust from a gas, said apparatus comprising in combination a case having a vertical tubular wall, a top end wall and a bottom end wall, and the following elements mounted in said case in series relation and coaxially with a vertical axis: a lower inlet tube extending through said bottom end wall for entry of the gas from which dust is to be removed, a centre core located above said inlet tube and an upper outlet tube extending through said top end wall of said case for exit of gas from which dust has been removed, said outlet tube, said core and said inlet tube defining with said tubular wall of said case an annular clear passage, said inlet tube and said core defining therebetween an annular gap and said core having a lower guide face for constraining gas issuing from said inlet tube to travel through said gap into said annular passage toward said tubular wall, an arrangement of blade means interposed between said inlet tube and said core for imparting giratory motion to the gas in the region of said gap, water supply means comprising an upper annular enclosure having apertures therein, said water supply means being located adjacent the upper end of said outlet tube and outside said outlet tube for supplying dust-removing water in the form of a continuous tubular stable wall of water coaxial with and outside said outlet tube, said core and said inlet tube in said annular passage, said arrangement of blade means being adapted to be in radially spaced relation to said wall of water, and circumferential communication means coaxial with said outlet tube for putting the inside of said outlet tube in communication with said annular passage, whereby the gas from which dust is to be removed is constrained to travel first radially outwardly through said wall of water and then radially inwardly through said wall of water before leaving the apparatus by way of said communication means and said outlet tube.

2. An apparatus as claimed in claim 1, wherein said arrangement of blade means comprise a lower set of blades and an upper set of blades disposed in series relation relative to the flow of the gas.

3. An apparatus for removing dust from a gas, said apparatus comprising in combination a case, feed and guide means for the gas comprising the following elements mounted in said case in series relation and coaxially with a vertical axis: a lower inlet tube for supplying the gas from which dust is to be removed, a centre core, and an upper outlet tube for the gas from which the dust has been removed, said inlet tube and said core defining therebetween an annular gap, means for feeding and guiding dust-removing water so that the water falls in the form of a stable cylindrical wall of water surrounding and coaxial with said outlet tube, said core and said inlet tube, and means for constraining said gas to pass through said wall of water, said inlet tube and said core carrying means for imparting a giratory motion to the gas in the region of said gap, said giratory motion imparting means comprising an upstream set of blades disposed in said lower inlet tube between said inlet tube and a cylindroconical depending portion of said core and adapted to deviate the gas radially and a downstream set of blades located in the region of said gap and adapted to impart a giratory motion to the gas so that at the periphery of said motion the path of the gas is roughly tangent to said wall of water.

4. An apparatus as claimed in claim 3, wherein the directrix of the blades of said first set of blades subtends an angle at the centre of the order of 45° and the tangents to the upper and lower ends of the blades respectively make with a horizontal plane and with a vertical line angles of about 30° and 15°.

5. An apparatus for removing dust from a gas, said apparatus comprising in combination a case, feed and guide means for the gas comprising the following elements mounted in said case in series relation and coaxially with a vertical axis: a lower inlet tube for supplying the gas from which dust is to be removed, a centre core, and an upper outlet tube for the gas from which the dust has been removed, said inlet tube and said core defining therebetween an annular gap, means for feeding and guiding dust-removing water so that the water falls in the form of a stable cylindrical wall of water surrounding and coaxial with said outlet tube, said core and said inlet tube, and means for constraining said gas to pass through said wall of water, said inlet tube and said core carrying means for imparting a giratory motion to the gas in the region of said gap, said giratory motion-imparting means comprising an upstream set of blades and a downstream set of blades disposed in series relation, said two sets of blades comprising helicoidal blades carried respectively by the inner face of said inlet tube and by a lower conical face of said core.

6. An apparatus for removing dust from a gas, said apparatus comprising in combination a case, feed and guide means for the gas comprising the following elements mounted in said case in series relation and coaxially with a vertical axis: a lower inlet tube for supplying the gas from which dust is to be removed, a centre core, and an upper outlet tube for the gas from which the dust has been removed, said inlet tube and said core defining therebetween an annular gap, means for feeding and guiding dust-removing water so that the water falls in the form of a stable cylindrical wall of water surrounding and coaxial with said outlet tube, said core and said inlet tube, and means for constraining said gas to pass through said wall of water, said inlet tube and said core carrying means for imparting a giratory motion to the gas in the region of said gap, said core comprising two opposed frustoconical portions, the lower large base of the upper frustoconical portion extending beyond the lower frustoconical portion so as to convert said wall of water flowing from said upper frustoconical portion into a free wall of water surrounding said gap between said core and said gas inlet tube.

7. An apparatus as claimed in claim 6, wherein said upper frustoconical portion of said core has a half angle at the apex of less than 30°.

8. An apparatus as claimed in claim 7, wherein said half angle is more than 15°.

9. An apparatus as claimed in claim 1, wherein said annular communication means comprise an annular gap between said outlet tube for the passage of the gas from said annular passage into said outlet tube.

10. An apparatus as claimed in claim 8, wherein said upper tube terminates at its lower end in a rounded and smooth outer edge.

11. An apparatus as claimed in claim 1, wherein said annular communication means comprise a series of apertures in said outlet tube for the passage of the gas from said annular passage into said outlet tube.

12. An apparatus for removing dust from a gas, said apparatus comprising in combination a case, feed and guide means for the gas comprising the following elements mounted in said case in series relation and coaxially with a vertical axis: a lower inlet tube for supplying the gas from which dust is to be removed, a centre core, and an upper outlet tube for the gas from which the dust has been removed, said inlet tube and said core defining there between an annular gap, means for feeding and guiding dust-removing water so that the water falls in the form of a stable cylindrical wall of water surrounding and coaxial with said outlet tube, said core and said inlet tube, and means for constraining said gas to pass through said wall of water, said inlet tube and said core carrying means for imparting a giratory motion to the gas in the region of said gap, said water feeding and guiding means comprising an upper annular enclosure which surrounds said upper outlet tube and has apertures for causing the water to flow against said upper tube so as to form by the effect of gravity around said two tubes and said core a continuous wall of water of revolution about said vertical axis, said upper circular enclosure having a partition wall dividing said enclosure into an upper compartment and a lower compartment which intercommunicate by way of passage means provided around said upper tube in said partition wall, said upper compartment having the shape of a volute extending around said upper tube and having a width decreasing from one of its ends in which is inserted a water supply pipe, said lower compartment having a bottom and oblique apertures in said bottom which converge downwardly towards the outer face of said upper tube so as to direct jets of water against said outer face.

13. An apparatus as claimed in claim 1, wherein said water supply means extend circumferentially of said gas outlet tube and are combined with an overflow system to which it supplies the water, said overflow system causing said water to overflow onto the outer face of said gas outlet tube.

References Cited

UNITED STATES PATENTS

| | | | |
|---|---|---|---|
| 2,259,030 | 10/1941 | Fisher | 55—238 |
| 2,259,033 | 10/1941 | Fisher | 261—79.1 |
| 2,259,034 | 10/1941 | Fisher | 261—79.1 |
| 2,496,281 | 1/1950 | Fisher | 261—79.1 |
| 3,233,879 | 2/1966 | Mitchell | 261—79.1 |
| 3,360,247 | 12/1967 | Waldhofer | 55—223 |

REUBEN FRIEDMAN, Primary Examiner

C. N. HART, Assistant Examiner

U.S. Cl. X.R.

261—79, 112, 126